US009892214B2

(12) United States Patent
Morrow et al.

(10) Patent No.: US 9,892,214 B2
(45) Date of Patent: Feb. 13, 2018

(54) SYSTEMS AND METHODS FOR 3D PRINTING OF LACROSSE HEADS

(71) Applicant: Warrior Sports, Inc., Warren, MI (US)

(72) Inventors: David K. Morrow, Metamora, MI (US); Dale W. Kohler, Metamora, MI (US); Richard J. Janisse, Windsor (CA)

(73) Assignee: Warrior Sports, Inc., Warren, MI (US)

( * ) Notice: Subject to any disclaimer, the term of this patent is extended or adjusted under 35 U.S.C. 154(b) by 365 days.

(21) Appl. No.: 14/563,434

(22) Filed: Dec. 8, 2014

(65) Prior Publication Data
US 2015/0165692 A1 Jun. 18, 2015

Related U.S. Application Data

(60) Provisional application No. 61/917,593, filed on Dec. 18, 2013.

(51) Int. Cl.
*G06F 19/00* (2011.01)
*G06F 17/50* (2006.01)
(Continued)

(52) U.S. Cl.
CPC .............. *G06F 17/50* (2013.01); *A63B 59/20* (2015.10); *B33Y 80/00* (2014.12); *A63B 2209/02* (2013.01)

(58) Field of Classification Search
CPC ... B29C 66/301; B29L 2031/52; G06F 17/50; B33Y 80/00; A63B 59/20; A63B 2102/14
(Continued)

(56) References Cited

U.S. PATENT DOCUMENTS 6,110,411 A 8/2000 Clausen et al.
8,114,334 B2 2/2012 Martinoni et al.
(Continued)

FOREIGN PATENT DOCUMENTS

WO WO 2013049889 A1 * 4/2013 ............. G06T 19/00

OTHER PUBLICATIONS

Chang, Alexandra, New 3D Printer by MarkForged Can Print With Carbon Fiber, dated Jan. 27, 2014, downloaded from http://www.popularmechanics.com/technology/gadgets/news/new-3d-printer-by-markforged-can-print-with-carbon-fiber-16428727?click=pm_latest on Dec. 8, 2014.

*Primary Examiner* — Miranda Huang
*Assistant Examiner* — Brian T McMenemy
(74) *Attorney, Agent, or Firm* — Warner Norcross & Judd LLP

(57) ABSTRACT

Methods for the individualized design and manufacture of lacrosse heads using point of sale additive fabrication. In one aspect, a subscription-based method includes digitizing a plurality of lacrosse heads having different three-dimensional attributes, storing the resulting digital object data into a digital lacrosse head library, transmitting the digital lacrosse head library to a subscriber, recording the number of lacrosse heads formed by the subscriber using additive fabrication, and generating an invoice based on the number of formed lacrosse heads. In another aspect, a method includes displaying images of lacrosse heads on a user interface, enabling the user-specified selection of discrete components of a lacrosse head, enabling the user specification combination of the discrete components, superimposing the user-specified combination to form a digital object representation of a lacrosse head, forming a tangible three-dimensional lacrosse head by additive fabrication, and trans- (Continued)

ferring the tangible three-dimensional lacrosse head to the consumer.

11 Claims, 5 Drawing Sheets

(51) Int. Cl.
 *B33Y 80/00* (2015.01)
 *A63B 59/20* (2015.01)
(58) Field of Classification Search
 USPC .......................................................... 700/98
 See application file for complete search history.

(56) References Cited

U.S. PATENT DOCUMENTS

| | | | | |
|---|---|---|---|---|
| 8,282,512 | B1* | 10/2012 | Winningham | A63B 59/20 473/513 |
| 8,548,620 | B2* | 10/2013 | Pettibone | G06F 17/5004 700/103 |
| 2002/0052807 | A1* | 5/2002 | Han | G06Q 30/06 705/26.1 |
| 2010/0088650 | A1* | 4/2010 | Kaltenbach | G06Q 20/18 715/849 |

* cited by examiner

SYSTEMS AND METHODS FOR 3D PRINTING OF LACROSSE HEADS

BACKGROUND OF THE INVENTION

The present invention relates to systems and methods for 3D printing, and in particular, 3D printing of lacrosse heads.

3D printing involves the accumulation of two-dimensional layers to form a three-dimensional object. Sometimes referred to as additive fabrication, 3D printing begins with a digital model. The digital model is separated into cross-sections and printed in layers, with each layer corresponding to a cross-sectional slice of the digital model. The resulting object is a three-dimensional representation of the digital model.

A variety of techniques exist for the formation of three-dimensional objects using 3D printing. According to some techniques, a moveable nozzle head deposits an extruded thermoplastic in successive layers. According to other techniques, a thin layer of powder is deposited on a tray. The thin layer of powder is selectively bonded by printing an adhesive in the shape of each cross-section. The thin layer of powder can alternatively be cured or sintered using a laser or an electron beam.

3D printing offers many advantages over conventional manufacturing methods, including for example, the flexible design and low-cost manufacture of physical objects. Additional advantages include the near elimination of transportation costs and product warehousing. Despite these advantages, however, 3D printing has not yet been realized in point of sale or other applications. Instead, 3D printing is largely limited to rapid prototyping and use by individual hobbyists.

SUMMARY OF THE INVENTION

Improved systems and methods for individualized and on-demand design and manufacture of lacrosse heads using 3D printing are provided.

In one aspect, a system for subscription-based access to digital object models for point of sale 3D printing is provided. The system generally includes a digital lacrosse head library connected to multiple subscribers over a network. The digital lacrosse head library controls the organization, storage, management and retrieval of the digital object models which can be representative of actual lacrosse heads. For example, the digital lacrosse head library includes a server with computer readable instructions that, when executed, cause the server to transmit one or more of the digital object models to a subscriber.

In another aspect, a subscription-based method of forming multiple lacrosse heads is provided. The method generally includes digitizing multiple lacrosse heads having different three-dimensional attributes, storing the resulting digital object data in the digital lacrosse head library, transmitting or providing access to at least a portion of the digital lacrosse head library to a subscriber, recording the number of lacrosse heads formed by the subscriber, and generating an invoice based on the number of formed lacrosse heads at preselected time intervals.

In still another aspect, a method of forming a lacrosse head according to a 3D print operation is provided. The method includes displaying to a consumer multiple images of lacrosse heads or multiple physical lacrosse heads, receiving input from the consumer to identify a preselected lacrosse head, retrieving digital lacrosse head data from the digital lacrosse head library, communicating the digital lacrosse head data to a 3D printer, forming the tangible three-dimensional lacrosse head, and transferring the tangible three-dimensional lacrosse head to the consumer, optionally for a purchase price.

In yet another aspect, a method of forming a lacrosse head using a 3D printer is provided. The method includes displaying images of lacrosse heads on a user interface, enabling a user to select specified discrete components of a lacrosse head, superimposing the user-specified combination of discrete components of a lacrosse head to form a digital object representation of a lacrosse head, forming a tangible three-dimensional lacrosse head according to a 3D print operation, and transferring the tangible three-dimensional lacrosse head to the consumer, optionally for a purchase price.

The embodiments herein offer improvements over existing methods of manufacturing, distribution and marketing. For example, the embodiments offer potential improvements in product customization, allowing a consumer to combine the desired attributes of different lacrosse heads in a customized 3D printed lacrosse head. The embodiments can also realize the near elimination of transportation costs and the potential reduction in manufacturing costs.

These and other objects, advantages, and features of the invention will be more fully understood and appreciated by reference to the description of the current embodiments and the drawings.

Before embodiments of the invention are explained in detail, it is to be understood that the invention is not limited to the details of operation or to the details of construction and the arrangement of the components set forth in the following description or illustrated in the drawings. The invention may be implemented in various other embodiments and may be practiced or carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENTS

The current embodiments relate to methods for the individualized selection, design and/or manufacture of lacrosse heads using 3D printing, optionally at a point of sale. Below is a system overview (Part I), and a variety of embodiments including: a) subscription-based access to a lacrosse head digital product library (Part II), b) on-site manufacturing of proprietary lacrosse heads designs, optionally at the point of sale (Part III), and c) on-site customization of proprietary lacrosse head designs with selectable lacrosse head sub-parts, optionally at the point of sale (Part IV).

I. System Overview

Figure 1:
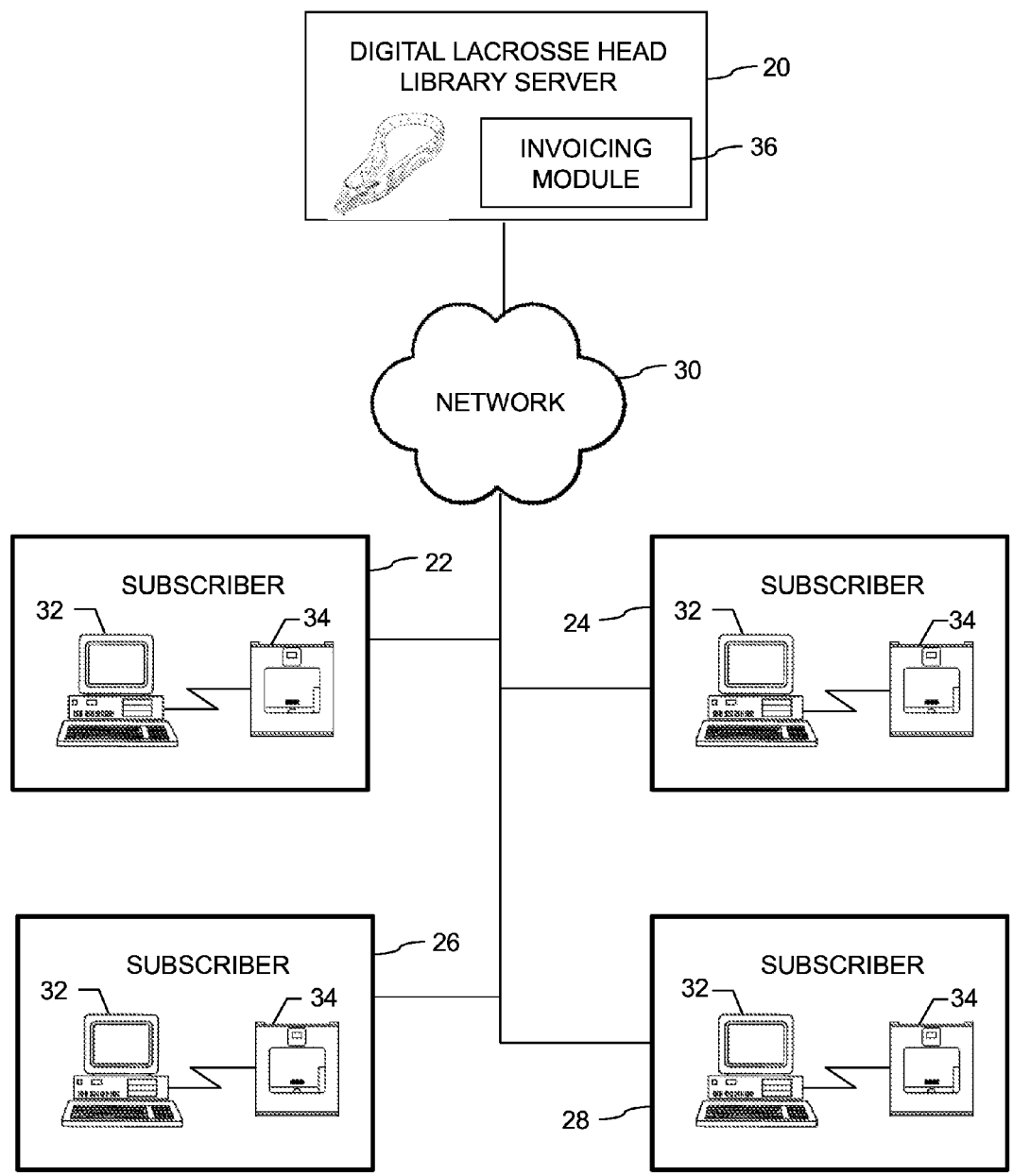
FIG. 1 is block diagram of a system for controlled access to digital object data pertaining to 3D printed lacrosse heads.

FIG. 1 is a block diagram depicting an example system for providing subscription based access to digital object models for point of sale 3D printing in accordance with one embodiment of the invention. The 3D printing can be performed at a point of sale or other location, depending on the application. The system 10 generally includes a digital library server 20 connected to a plurality of subscribers 22, 24, 26, 28 over a network 30. The digital library server 20 controls the organization, storage, management and retrieval of digital object models on behalf of a digital rights holder, for example, the owner of proprietary rights, data or other information pertaining to the design of the lacrosse heads. More particularly, the digital library server 20 generally includes computer readable memory including a plurality of digital object models, each pertaining to a physical lacrosse head construction. As an example, a digital object model may include the specification, dimension, code and/or other data relating to a particular lacrosse head. Generally, with this digital object model, the digital library server 20 additionally includes computer readable instructions that, when executed, cause the server to transmit, or make available, one or more of the digital object models to a subscriber, e.g., a retailer or a third-party vendor. Each subscriber includes a computer terminal 32 and a 3D printer 34, which are communicably coupled to each other, optionally over a local area network (LAN). The computer terminal 32 includes temporary storage for the digital object model, for example Random Access Memory (RAM). The 3D printer 34 is adapted to perform a print operation based on the digital object model stored to the computer terminal 32 or otherwise transmitted or transferred to the 3D printer 34. The above mentioned network 30 can include the Internet or other group of interconnected computers. The network 30 can also include a local area network, a wide area network, or a wireless network, for example. Further, although referred to as a computer or computer terminal, devices suitable for digital object model storage, manipulation or transmission can include any processor, smartphone, tablet or other implementation.

II. Subscription Access to a Digital Lacrosse Head Library

Figure 2:
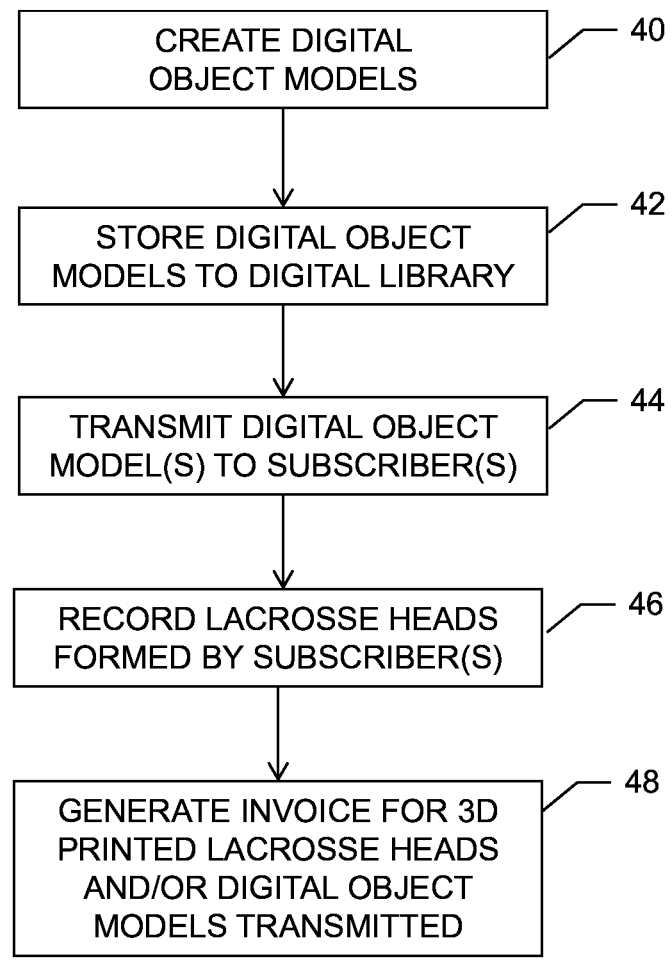
FIG. 2 is a flow chart for a method of providing subscription-based access to a digital lacrosse head library.

Referring now to FIG. 2, a flow chart illustrating a method for providing subscription-based access to a lacrosse head digital product library is provided. In general terms, the method according to one embodiment includes: a) creating digital object models for multiple lacrosse heads having different 3D attributes, b) storing the digital object models to computer readable memory to create a digital lacrosse head library, c) transmitting at least a portion of the digital lacrosse head library to a subscriber, d) recording the number of lacrosse heads formed by the subscriber, and e) generating an invoice to the subscriber based on the number of lacrosse heads formed at preselected time intervals.

Creating the digital object models is depicted as step 40 in FIG. 2. This step generally includes, for a plurality of lacrosse head constructions, creating a computer representation of a physical lacrosse head, optionally using computer aided design (CAD) software or computer aided manufacturing (CAM) software. CAD/CAM software can include, for example, SolidWorks by Dassault Systèmes SolidWorks Corp., Solid Edge by Siemens PLM Software, or Autodesk Inventor by Autodesk. Creating the digital object models additionally can include converting each CAD/CAM file into a digital object model that is compatible with a 3D printer. Suitable conversion software can include Inkscape, 3-Matic, MeshLab, or Magics, for example. In one embodiment, the digital object model includes a mesh file that defines the three-dimensional shape of the lacrosse head. The mesh file includes a polygonal mesh in a file format supported by a 3D printer, including for example the STL (stereolithography) file format. The polygonal mesh includes vertices, edges, faces, polygons and surfaces that together form the digital representation of a given lacrosse head. The mesh file can optionally include sub-parts, for example sub-parts corresponding to different sub-components of the lacrosse head. Exemplary sub-components include, but are not limited to, the sidewalls, scoop, base, and throat of the lacrosse head, discussed in more detail in Part IV below.

After the digital object models are created, including any sub-parts thereof, they are saved to a digital lacrosse head library at step 42. The digital lacrosse head library is stored to the library server 20. In the present embodiment, a database administrator associated with the library server 20 selectively authorizes subscriber accounts to individual subscribers 22, 24, 26, 28, and for each subscriber account, designates which of the plurality of digital object models will be available for download by the subscriber, as well as the terms and conditions accompanying the digital object models. These rights are generally not shared with the subscribers. In particular, the digital object models generally cannot be altered by a subscriber (except as set forth in Part IV below), and a subscriber generally cannot unilaterally increase or decrease accessibility to the digital lacrosse head library, e.g., add or subtract from the number of digital object models, and related lacrosse head data, that are available from the digital lacrosse head library.

The digital library server 20 transmits, or makes available, at least a portion of a digital object model to a designated subscriber at step 44. For example, the digital library server 20 executes an instruction set that causes the server 20 to perform the step of transmitting, to a subscriber computer 32, a digital object model pertaining to a desired lacrosse head. Also by example, the digital library server 20 executes an instruction set that causes the server 20 to perform the step of making available, to a subscriber computer 32, a digital object model pertaining to a desired lacrosse head. The subscriber computer 32 then executes an instruction set to cause the subscriber computer 32 to transmit the digital object model to the 3D printer 34.

The 3D printer 34 can perform a print operation based on the digital object model from the subscriber computer 32. As used herein, "print" or "print operation" includes any technique that deposits or creates material on a surface or substrate in a controlled manner. In one embodiment, the print operation generally includes printing successive layers of thermoplastic material from a plastic extrusion nozzle, where each layer of thermoplastic material corresponds to a cross-sectional slice of the lacrosse head. Exemplary lacrosse heads are illustrated by non-limiting example in the following patents: RE38,216 to Morrow et al, U.S. Pat. No. 8,512,173 to Winningham et al, U.S. Pat. No. 8,029,390 to Winningham et al, U.S. Pat. No. 8,021,250 to Schmidt, U.S. Pat. No. 7,993,221 to Herman et al, U.S. Pat. No. 7,931,548 to Lamson et al, U.S. Pat. No. 7,749,113 to Morrow et al, RE40,182 to Morrow et al, U.S. Pat. No. 7,331,884 to Samaras et al, U.S. Pat. No. D660,930 to Morrow et al, U.S. Pat. No. D654,974 to Lamson et al, and U.S. Pat. No. D644,282 to Schmidt, all of which are hereby incorporated by reference in their entirety.

At step 46, an invoicing module 36 associated with the server 20 assembles and/or determines a record of the number of lacrosse heads formed by one or more subscribers, and optionally all subscribers, over a time period. Alternatively, or additionally, the invoicing module can assemble and/or determine a record of all the digital object models downloaded to one or more subscribers. The records of the lacrosse head formed and models downloaded can be compared for auditing purposes to ensure the subscribers are complying with a subscriber agreement.

Step 46 can include maintaining an invoicing database of each lacrosse head formed by a subscriber using a digital object model from the digital lacrosse head library. The invoicing module is generally separate from the digital lacrosse head library in the present embodiment, and aggregates information pertaining to each subscriber transaction. The information can include, for example, the type and quantity of each 3D printed lacrosse head, the applicability of any promotions, and any credits awarded for damaged or defective lacrosse heads. This information can originate from each subscriber on a transaction by transaction basis, or can be bundled with other transactions or with other subscriber data when communicated to the invoicing module 36.

At step 48, the invoicing module 36 generates an invoice for one or more subscribers, and optionally all of the subscribers, for a time period which may be recurring. Each invoice can include a subscription fee for (a) subscriber access to the library server 20 in general, (b) the use of each digital object model in particular, and/or (c) any other considerations. The subscription fee according to these criteria can vary from subscriber to subscriber based on a number of factors. For example, subscriber access to a subset of the available digital object models can correspond to a first subscription fee, while subscriber access to all of the available digital object models can correspond to a second subscription fee greater than the first subscription fee. Also by example, different digital object models can each correspond to different subscription fees, such that no two digital object models correspond to the same subscription fee. Each invoice can include a description, an amount owed, a tax owed, and/or other information as desired. Various verifications can be performed prior to transferring the invoice to the subscriber. For example, some or all of the invoices can be checked for completeness, and/or various data items can be checked against each other to verify no conflict exists.

III. 3D Printing of Lacrosse Heads at the Point of Sale

Figure 3:
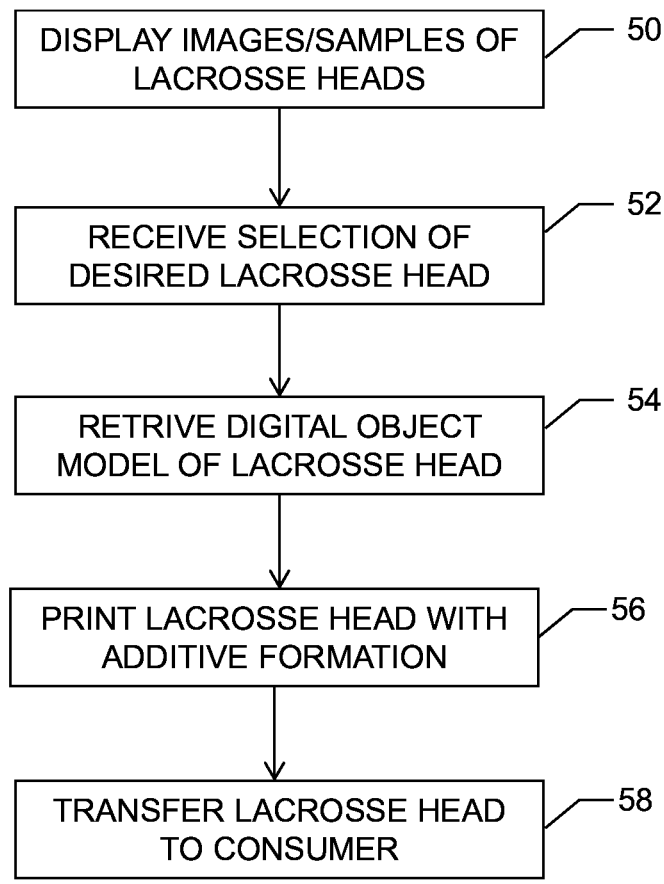
FIG. 3. is a flow chart for a method of forming a lacrosse head according to a 3D print operation.

Referring now to FIG. 3, a flow chart illustrating a method for forming a lacrosse head is provided. In general terms, the method according to one embodiment includes a) displaying to a consumer a plurality of images of lacrosse heads and/or a plurality of physical lacrosse head samples, b) receiving input from the consumer to identify a selected lacrosse head, c) retrieving a digital object model pertaining to the selected lacrosse head, d) performing a 3D print operation based on the digital object model, and e) transferring a 3D printed lacrosse head to the consumer for a purchase price.

Displaying a lacrosse head to a consumer is depicted as step 50 in FIG. 3. This step generally includes presenting one or more virtual or physical lacrosse heads to a consumer for selection. This step can include an internet-based presentation of printable lacrosse heads, an in-store presentation of printable lacrosse heads, or the traditional print advertising of printable lacrosse heads. For example, one or more virtual lacrosse heads can be presented to the consumer on a graphical user interface, optionally available in multiple views or rotatable as a three-dimensional virtual object. The virtual lacrosse heads can be hosted on a web server associated with the library server 20 in some embodiments, while in other embodiments the virtual lacrosse heads can be hosted on a server associated with the subscriber. For example, the subscriber can host a website depicting virtual lacrosse heads available for 3D printing. In this embodiment, the subscriber can present side-by-side comparisons of the virtual lacrosse heads available to the consumer. Where physical lacrosse heads are displayed for an in-store presentation, the physical lacrosse heads can be scaled up, scaled down, or presented to-scale. The virtual and physical lacrosse heads can also include a variety of colors and finishes that are representative of the options potentially available to the consumer under the subscriber's particular subscription.

Receiving input from the consumer to identify a selected lacrosse head is depicted as step 52 in FIG. 3. The consumer's selection can originate from a device associated with the consumer, for example a computer, a laptop, a tablet, or a smartphone. Alternatively, the consumer's selection can include an in-person designation. The consumer's selection can include the type of lacrosse head, the quantity, the finish, the color, the material properties, and any modifications available to the subscriber. At step 54, the subscriber retrieves the digital object model(s) pertaining to the consumer's selection. As noted above, the digital object model(s) can be accessed on an as needed basis from the library server 20. Alternatively, the digital object model(s) can be accessed from memory associated with the subscriber. For example, the subscriber computer terminal 32 can include temporary storage for the digital object model(s) available to the subscriber under the subscriber's particular subscription. In one embodiment, the digital object model(s) includes a mesh file that defines the three-dimensional shape of the selected lacrosse head. The mesh file includes a polygonal mesh in a file format support by a 3D printer, including for example the STL file format. The mesh file can optionally include sub-parts, for example sub-parts corresponding to different sub-components of the lacrosse head. The digital object model(s) can additionally include data pertaining to the user's selected finish, color, and/or material properties, provided such options are available to the subscriber.

Performing a 3D print operation is depicted as step 56 in FIG. 3. The 3D print operation generally includes any technique that deposits or creates material in successive layers to form a three-dimensional object. In one embodiment, performing a 3D print operation begins with computer readable instructions on the subscriber computer 32 that, when executed, cause the 3D printer 34 to form the selected lacrosse head according to the associated data object model. Forming the selected lacrosse head generally includes printing successive layers of a thermoplastic, polymeric, metal or other material from an extrusion nozzle, where each layer of the material corresponds to a cross-sectional slice or other dimension of the lacrosse head. The 3D printer 34 performing this task can include any 3D printer having a build volume suitably sized for a lacrosse head. Example 3D printers include, without limitation, the Replicator 2 available from MakerBot Industries of Brooklyn, N.Y., the Cube available from 3D Systems of Rock Hill, S.C., and the Solidoodle 2 available from Solidoodle LLC of Brooklyn, N.Y. The selected 3D printing material can include any material providing the desired material properties. The material properties can include strength, melting temperature, and coefficient of thermal expansion. Example materials include, without limitation, thermoplastic materials, such as acrylonitrile butadiene styrene (ABS) and polylactide (PLA), metals, such as alloys, composites and combinations of the foregoing. Other thermoplastic materials and non-thermoplastic materials can be used in other embodiments where desired. Optional post production techniques including sanding, acetone washes, and/or decaling.

Transferring a 3D printed lacrosse head to the consumer for a purchase price is depicted as step 58 in FIG. 3. This step generally involves the documentation of the transaction for subsequent communication to the invoicing module 36. The documented information can include, for example, the type of 3D printed lacrosse head, the purchase price, the applicability of any promotions sponsored by the digital rights holder, the applicability of any promotions sponsored by the subscriber, any credits applied from a previous transaction, and the applicability of any warranty coverage. This information can be electronically communicated to the invoicing module 36 on a transaction by transaction basis, or can be bundled with other transactions or with other subscriber data after a predetermined period has lapsed.

IV. Customization of Lacrosse Head Designs

Figure 4:
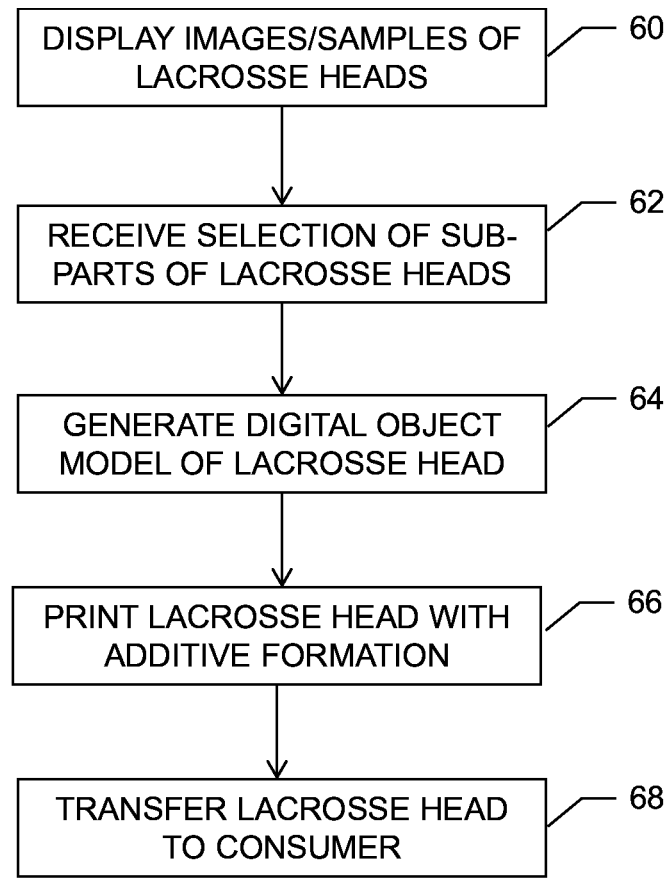
FIG. 4 is a flow chart for a method of forming a lacrosse head according to a 3D print operation using user-selectable three-dimensional attributes.

Referring now to FIG. 4, a flow chart illustrating a method for forming a customizable lacrosse head is provided. As described below, the present method allows a consumer to modify or enhance an existing digital object model which is then used to create a tangible lacrosse head. In general terms, the method according to one embodiment includes a) displaying to a consumer the available three-dimensional attributes for a 3D printed lacrosse head, b) receiving input from the consumer to identify selected three-dimensional attributes, c) superimposing the selected combination of three-dimensional attributes to form a new or modified digital object model, d) 3D printing the lacrosse head according to the new or modified digital object model, and e) transferring the 3D printed lacrosse head to the consumer for a purchase price.

Displaying the available three-dimensional attributes is depicted as step 60 in FIG. 4. This step generally includes presenting one or more three-dimensional attributes (discussed below) for selection by the user. In some embodiments, the three-dimensional attributes are presented independently of one another. For example, the subscriber and/or the digital rights holder can host a website depicting each three-dimensional attribute independently from one another, optionally as a rotatable three-dimensional virtual object. In other embodiments, the three-dimensional attributes can be presented in combination with other three-dimensional attributes. For example, the subscriber and/or the digital rights holder can host a website depicting the combinations available for 3D printing. Each combination can include at least one three-dimensional attribute from a first digital object model and at least one three-dimensional attribute from a second digital object model, and optionally further digital object models. The three-dimensional attributes can also include a variety of colors and finishes that are representative of the options available under the subscriber's particular subscription.

Figure 5:
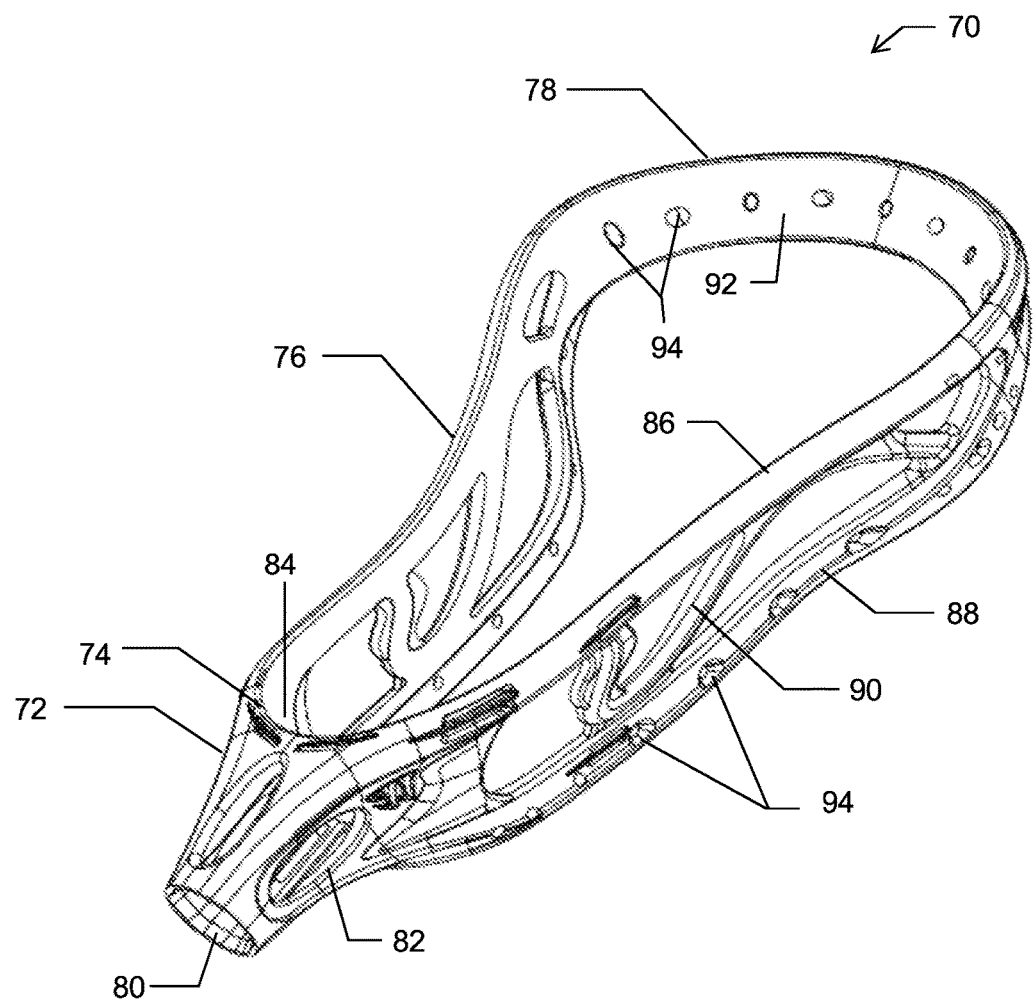
FIG. 5 is a perspective view of a lacrosse head illustrating various three-dimensional attributes of a lacrosse head.

As noted above, the present method allows a consumer to select discrete three-dimensional attributes to create a customized lacrosse head. As used herein, a three-dimensional attribute includes any constituent portion of a lacrosse head. Example constituent portions of the lacrosse head 70 illustrated in FIG. 5 include a throat 72, a base 74, a sidewall 76, a scoop 78, combinations thereof, subcomponents thereof, and combinations of subcomponents thereof. A brief description of these constituent portions follows. The throat 72 generally includes a socket 80 for receive a handle. In the lacrosse head illustrated in FIG. 5, the socket 80 is tubular in exterior shape, hexagonal in interior shape, includes apertures or holes 82 to reduce the weight of the lacrosse head 70, and extends from the base 74. The base 74 generally includes a ball stop 84 to receive a lacrosse ball therein. In the lacrosse head illustrated in FIG. 5, the ball stop 84 is arcuate, and serves as a point of origin for the sidewalls 76. The sidewalls 76 extend between the base 74 and the scoop 78. In the lacrosse head illustrated in FIG. 5, the sidewalls 76 include an upper rail 86, a lower rail 88, and cross-members 90 extending therebetween. The scoop 78 generally includes a curved arcuate member including a sloped inner surface 92. In the lacrosse head illustrated in FIG. 5, the scoop 78 includes holes 94 that allow attachment of a net to the lacrosse head 70. The holes 94 continue along the lower rail 88 and the base 74 and border a ball receiving area defined by the ball stop 84, the sidewalls 76, and the scoop 78.

Receiving a selection of the desired three-dimensional attribute(s) is depicted at step 62 in FIG. 4. The consumer's selection can include a base lacrosse head and the desired three-dimensional attributes to be incorporated into the base lacrosse head. For example, the consumer may select the EVO lacrosse head from Warrior Sports, Inc., as the base lacrosse head, and may further select the sidewall from the NOZ® lacrosse head from Warrior Sports, Inc. Further by example, the consumer may select the REVOLUTION lacrosse head from Warrior Sports, Inc., as the base lacrosse head, and may further select the scoop from the COBRA lacrosse head and the sidewall from the RABIL lacrosse head, both available from Warrior Sports, Inc. The consumer's section can also include three-dimensional attributes from a plurality of lacrosse heads, such that no single lacrosse head constitutes a base lacrosse head. For example, the consumer may select a throat from the EVO lacrosse head, a base from the SWARM lacrosse head, sidewalls from the RABIL lacrosse head, and a scoop from the COBRA lacrosse head, each being available from Warrior Sports, Inc.

Superimposing the selected combination of three-dimensional attributes to form a new or modified digital object model is depicted at step 64 in FIG. 4. This step generally includes integrating or merging two or more polygonal mesh files to form a new polygonal mesh file for the desired 3D printed lacrosse head. In one embodiment, the library server 20 includes computer readable instructions that, when executed, integrate selected polygonal mesh files into a single STL file for transmission to the subscriber computer 32. In another embodiment, the subscriber computer 32 includes computer readable instructions that, when executed, integrate or merge selected polygonal mesh files into a single STL file for performing a 3D print operation. For example, the merging of selected STL files can be performed using MeshLab graphics software available from ISTI-CNR. In these embodiments, the digital rights owner and/or the subscriber exercises editing privileges for the data object models. The editing privileges can extend to all of the 3D attributes in some embodiments, while the editing privileges can extend to fewer than all of the 3D attributes in other embodiments. The newly formed data object model can be viewable by the consumer prior to initiation of the print operation in substantially the same manner as set forth above, and for further modification by the consumer.

Performing a 3D print operation is depicted as step 66 in FIG. 4. The 3D print operation is similar to the 3D print operation discussed above in connection with step 56 of FIG. 3. The 3D print operation generally includes any technique that deposits or creates material in successive layers to form a three-dimensional object. In one embodiment, performing a 3D print operation begins with computer readable instructions on the subscriber computer 32 that, when executed, cause the 3D printer 34 to form the selected lacrosse head according to the new data object model. Forming the selected lacrosse head generally includes printing successive layers of a material from a extrusion nozzle, where each layer of the material corresponds to a cross-sectional slice of the lacrosse head. Optional post production techniques including sanding, acetone washes, and/or decaling.

When the lacrosse head is formed, the subscriber can determine whether the three-dimensional model meets the consumer's expectations, while also assigning a product number which is engraved, printed, or labeled on the lacrosse head. At the completion of the print operation, the subscriber can additionally store the newly created digital object model in memory for subsequent use by the consumer. For example, the subscriber can assign an identifier to the newly created digital object model that is uniquely associated with the consumer, such that the consumer can access the newly created digital object model in subsequent transactions without repeating the integration or merging of constituent digital object models discussed above.

Transferring a 3D printed lacrosse head to the consumer for a purchase price is depicted as step 68 in FIG. 4. This step generally involves the documentation of the transaction for subsequent communication to the invoicing module 36. The documented information can include, for example, the constituent data object models used to create the finished data object model, the purchase price, the applicability of any promotions sponsored by the digital rights holder, the applicability of any promotions sponsored by the subscriber, any credits applied from a previous transaction, and the applicability of any warranty coverage. This information can be electronically communicated to the invoicing module 36 on a transaction by transaction basis, or can be bundled with other transactions or with other subscriber data after a predetermined period has lapsed.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to packages of any specific orientation(s). Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The invention claimed is:

1. A method of making a lacrosse head comprising:
creating digital object model data for a plurality of lacrosse heads having a plurality of different 3D attributes, the 3D attributes including at least one of sidewalls, scoops, bases, and throats;
storing the digital object model data to computer readable memory to create a digital lacrosse head library;
transmitting at least a portion of the digital lacrosse head library to a subscriber pursuant to a paid subscription so that the subscriber can display the plurality of lacrosse heads to a consumer;
forming a plurality of virtual lacrosse heads on a user interface at a retail point of sale in response to a selection of a combination of the 3D attributes from the transmitted digital lacrosse head library by the consumer, and recording a number of virtual lacrosse heads formed by the subscriber on the user interface within a preselected time period;
printing a plurality of physical lacrosse heads at the retail point of sale within the predetermined time period using an additive fabrication machine, the plurality of physical lacrosse heads being tangible representations of the plurality of virtual lacrosse heads, each of the plurality of physical lacrosse heads including a consumer-specified combination of the 3D attributes from at least two different ones of the plurality of lacrosse heads in the digital lacrosse head library;
determining the number of physical lacrosse heads printed by the subscriber at the retail point of sale within the preselected time period using the additive fabrication machine; and
generating an invoice for the subscriber based on the number of the physical lacrosse heads printed by the subscriber at the retail point of sale within the preselected time period.

2. The method according to claim 1 wherein the subscriber is a first subscriber among a plurality of subscribers each associated with a 3D printer.

3. The method according to claim 1 wherein the digital object model data includes a plurality of polygonal mesh files.

4. The method according to claim 1 wherein printing the plurality of physical lacrosse head includes printing the plurality of physical lacrosse head in accordance with an instruction set.

5. The method according to claim 4 wherein the instruction set is stored locally in a subscriber computer readable memory.

6. A method of making a lacrosse head at a retail point of sale comprising:

receiving access to a digital lacrosse head library from a digital rights holder pursuant to a subscription, the digital rights holder having ownership in the digital lacrosse head library, the digital lacrosse head library including digital object model data for a plurality of lacrosse heads having a plurality of different three-dimensional attributes selected from the group consisting of a sidewall, a scoop, a base, and a throat;

displaying, to a consumer, the plurality of lacrosse heads on a user interface;

receiving input from the consumer to identify a virtual lacrosse head, the virtual lacrosse head including a consumer-specified combination of three-dimensional attributes from at least two different ones of the plurality of lacrosse heads;

retrieving the digital lacrosse head model data from the digital lacrosse head library;

forming the virtual lacrosse head based on the digital lacrosse head model data, the virtual lacrosse head being presented on the user interface;

communicating an instruction set based on the digital lacrosse head model data to an additive fabrication machine;

printing a physical lacrosse head at the retail point of sale as a tangible representation of the virtual lacrosse head using the additive fabrication machine in accordance with the instruction set;

transferring the physical lacrosse head to the consumer; and providing payment to the digital rights holder based on the physical lacrosse head printed at the retail point of sale.

7. The method according to claim 6 wherein the digital lacrosse head model data includes a plurality of polygonal mesh files.

8. The method according to claim 7 wherein the plurality of polygonal mesh files are stored in the digital lacrosse head library in a plurality of sub-parts.

9. The method according to claim 8 wherein each of the plurality of sub-parts corresponds to the different three-dimensional attributes.

10. The method according to claim 9 wherein the three-dimensional attributes include at least two of a sidewall, a scoop, a base, and a throat.

11. The method according to claim 6 wherein the instruction set is stored locally in a subscriber computer readable memory.

* * * * *